(12) United States Patent
Feller (10) Patent No.: US 6,178,827 B1
(45) Date of Patent: Jan. 30, 2001

(54) ULTRASONIC FLOW SENSOR

(76) Inventor: Murray F. Feller, Q1577 NW. 75th Ave. Rd., Micanopy, FL (US) 32667

( * ) Notice: Under 35 U.S.C. 154(b), the term of this patent shall be extended for 0 days.

(21) Appl. No.: 09/458,315

(22) Filed: Dec. 10, 1999

Related U.S. Application Data (63) Continuation-in-part of application No. 09/298,558, filed on Apr. 22, 1999, now abandoned, and a continuation-in-part of application No. 09/356,960, filed on Jul. 19, 1999, now abandoned.

(51) Int. Cl.$^7$ .............................. G01F 1/66; G01F 1/32
(52) U.S. Cl. ............................. 73/861.27; 73/861.28; 73/861.22
(58) Field of Search .................... 73/861.27, 861.28, 73/861.29, 861.25, 861.22

(56) References Cited

U.S. PATENT DOCUMENTS 4,103,551 * 8/1978 Lynnworth ....................... 73/861.27
4,221,128 * 9/1980 Lawson et al. ................... 73/861.29

* cited by examiner

Primary Examiner—Harshad Patel
(74) Attorney, Agent, or Firm—David Kiewit

(57) ABSTRACT

A transit time ultrasonic fluid flow sensor is configured as a self contained modular unit that does not rely on acoustic transmissions through or reflected by a pipe for operation. A highly efficient transducer assembly transmits and receives signals which are well isolated from each other and which enables simplification of the supporting electronics. Continuous wave transmission and reception of the acoustic signals, and provision for acoustic path and electronic drifts enable the sensors to be physically small and yet to exhibit high sensitivity and measurement precision. Some versions of the apparatus sense flow along two orthogonal axes. In addition, electrolytic cleaning is provided for some versions of the sensor.

20 Claims, 2 Drawing Sheets

FIG. 2

ULTRASONIC FLOW SENSOR

CROSS REFERENCE TO RELATED APPLICATIONS

This application is a continuation-in-part of U.S. patent application Ser. No. 09/298,558 filed Apr. 22, 1999, and Ser. No. 09/356,960 filed Jul. 19, 1999, both now abandoned.

BACKGROUND OF THE INVENTION

TECHNICAL FIELD

The present invention relates to a simplified method for measuring the flow rate of a fluid whereby the propagation times of ultrasonic signals transmitted through the fluid can be detected to determine fluid flow rate. The invention further relates to improvement of a probe flow sensor configuration and to its installation, and similar sensing devices.

DISCUSSION

Transit-time ultrasonic flow sensors, also known as "time-of-flight" ultrasonic flow sensors, detect the acoustic propagation time difference between the upstream and downstream ultrasonic transmissions resulting from the movement of the flowing fluid and process this information to derive a fluid flow rate. Several different sensor configurations have been used including: 1) direct measurement of the propagation time of a pulse emitted by a first transducer and received by a second transducer where the change in time is a function of fluid flow rate; 2) dual "sing-around" sound velocimeters, where the difference in "sing-around" frequency between the velocimeters is a function of the fluid flow rate; 3) sensors producing continuous waves using two widely different high frequency carriers but commonly modulated with another much lower frequency signal where the phase difference of the modulated signal on the received carriers is a function of the fluid flow rate; and 4) sensors producing bursts of continuous waves using a single frequency on a pair of transducers, the burst duration being less than the acoustic propagation time between the transducers, where the time between the received transmissions is a function of flow rate.

The transducers of transit-time ultrasonic flow sensors are most often field mounted, whereby they are individually attached to the outside of a pipe, thereby offering the advantage of not having to break into the pipe as with other meters, in order to make the flow measurement. However, the uncertainty of the pipe wall integrity and the effects of its surface condition, and the uncertainties of locating, attaching and acoustically coupling the transducers to the pipe, and the uncertainties of the reflection from the interior of the pipe when it is used to complete the acoustic path between the transducers, can often lead to substantial measurement error. Even when the transducers are in contact with the fluid being measured (wetted), their mechanical location, which is again most often accomplished in the field, may result in misalignment or being disposed at the wrong distance or angle, again resulting in measurement error. As a result, these sensors are usually equipped with supporting electronics containing sophisticated diagnostic means for confirming proper installation and operation. Overall, these sensors are relatively expensive and have a reputation for sometimes producing erroneous measurements.

It is therefore an object of the present invention to provide means for reducing the complexity and cost of transit-time ultrasonic flow sensors, to improve their measurement reliability, and to make their installation easier.

It is a further object of the present invention to provide a cost effective means for enabling transit-time flow sensors to measure a fluid flow rate along two axes.

SUMMARY OF THE INVENTION

The above and other objects are satisfied with a transit-time flow sensor configured as a single modular unit as exemplified in accordance with preferred embodiments of the present invention. One of the preferred embodiments includes an insertion probe with two permanently mounted transducers which enters a relatively small opening in a pipe carrying a flowing fluid. A probe-mounted acoustically reflective surface is also provided to enable the acoustic path to be completed within the entity of the probe so that it does not depend upon any other reflective surface for its operation. This sensor is thus more simple in construction, easier to install correctly, and provides more reliable operation. The probe may of course be supplied factory mounted and calibrated in a short section of pipe, and thereby be considered a "full bore" sensor for replacement between two similar pipe sections.

The transducers are mounted one upstream and one downstream, in line with and at an angle to the fluid flow, and are directly wetted by the fluid. In this configuration the sensor is isolated from the attenuation and multipath problems which occur when the transducers are pipe mounted. The supporting electronics may be simplified in concept and incorporate cost effective components while still offering good measurement precision.

The method of flow rate sensing used with the present invention is different from the four methods listed previously in the "Discussion" hereof, in that it uses a variable frequency acoustic signal which is continuously transmitted by either one or the other transducers as they alternate between the transmitting and receiving functions. The relatively low alternation frequency is the exclusive modulation source and the primary detection of time difference occurs at the acoustic frequency without using an intermediate frequency. Since this method in its basic form is unstable because of both acoustic path and electronic related drifts and uncertainties, special provisions have been employed to correct these deficiencies so that high flow sensing sensitivity and zero stability, along with low noise level, is obtained.

In another preferred embodiment, two pairs of transducers are used within a single sensor housing and are located to determine fluid flow rate components along two orthogonal axes.

In a further preferred embodiment, an electric current is passed between surfaces of the sensor in the proximity of the acoustic path so that, by the process of electrolysis, those surfaces will be maintained clean.

BRIEF DESCRIPTION OF THE DRAWINGS

The various advantages of the present invention will become apparent to one skilled in the art by reading the following specification and subjoined claims and by referencing the following drawings in which:

DETAILED DESCRIPTION OF THE PREFERRED EMBODIMENTS

Figures 1, 1A:
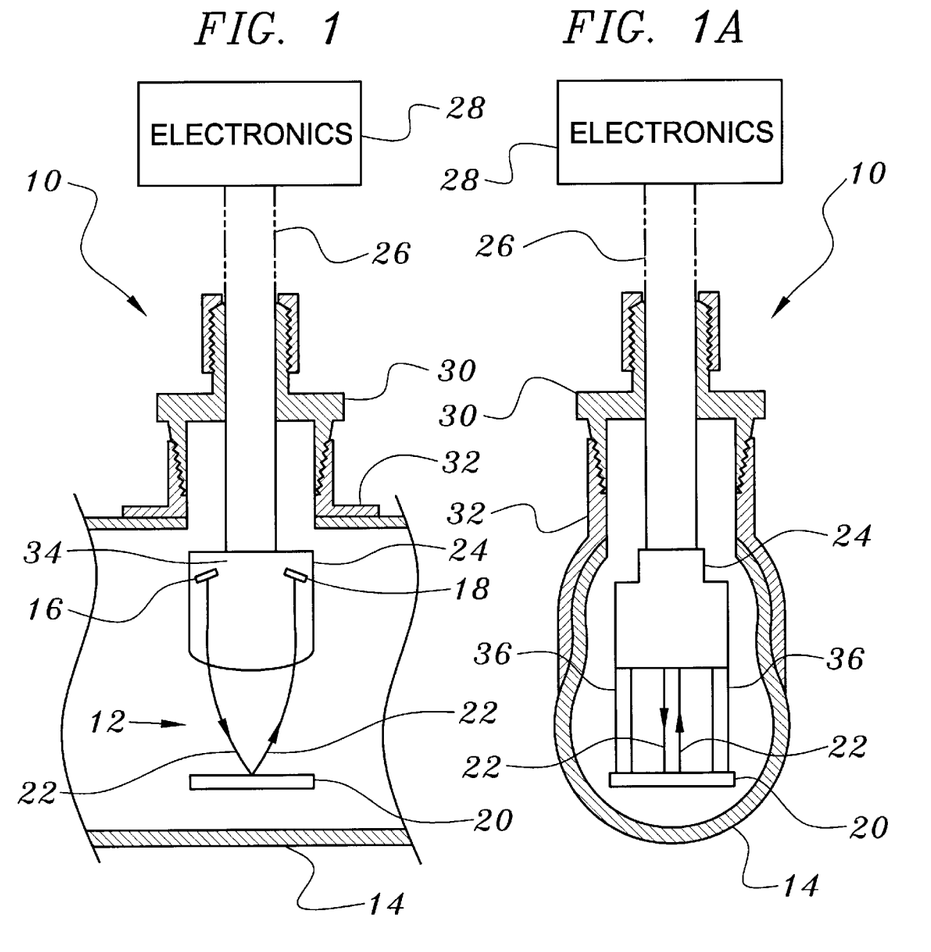
FIG. 1 illustrates a simplified side cross-sectional view of a preferred embodiment of the ultrasonic transit-time flow sensor of the present invention.
FIG. 1A illustrates a simplified end cross-sectional view of the sensor in FIG. 1.

Referring to FIG. 1 and to FIG. 1A, a flow sensor 10 in accordance with a preferred embodiment of the present invention as it would be typically mounted in a pipe, is shown. Fluid, the flow direction of which is represented by arrow 12 enters pipe 14 and passes between piezoelectric transducers 16 and 18, and a reflector 20. Transducers 16 and 18 are each mounted to reduce internal acoustic reflections and to direct transfer of acoustic energy between each other so that at least a component of the acoustic energy is along an axis parallel to the direction 12 of flow. A material 34 such as cork can be used as an acoustic energy absorbing material surrounding each transducer and as a barrier between the transducers, as may be required to provide the acoustic isolation needed for proper operation. The dominant acoustic energy transferred between the transducers 16 and 18, is beamed along the lines 22. A housing 24 mounting the transducers 16 and 18, joins with a stem 26 upon which is mounted an electronics enclosure 28. Reflector 20 is supported by posts 36. The stem 26 is mounted through hot tap fitting 30 to a pipe mounted fitting 32.

During operation one of the transducers 16 or 18 transmits while the other receives. Then they alternate functional states so that the transducer formerly transmitting is now receiving, and the transducer formerly receiving is now transmitting. Acoustic energy is being transmitted by one or the other transducer 16 or 18, all of the time and received by one or the other transducer 16 or 18, all of the time. The difference in phase shift between the acoustic energy signals of the two functional states is representative of fluid flow rate. With these and other refinements, the acoustically self contained module which sensor 10 exemplifies thereby exhibits low noise and high stability and measurement precision. The sensor 10 further enables the electronics to be simplified and the mechanical assembly to be standardized to cover a wide range of pipe sizes. Furthermore, the risk of improper operation due to installation or pipe related factors is greatly reduced.

Figure 2:
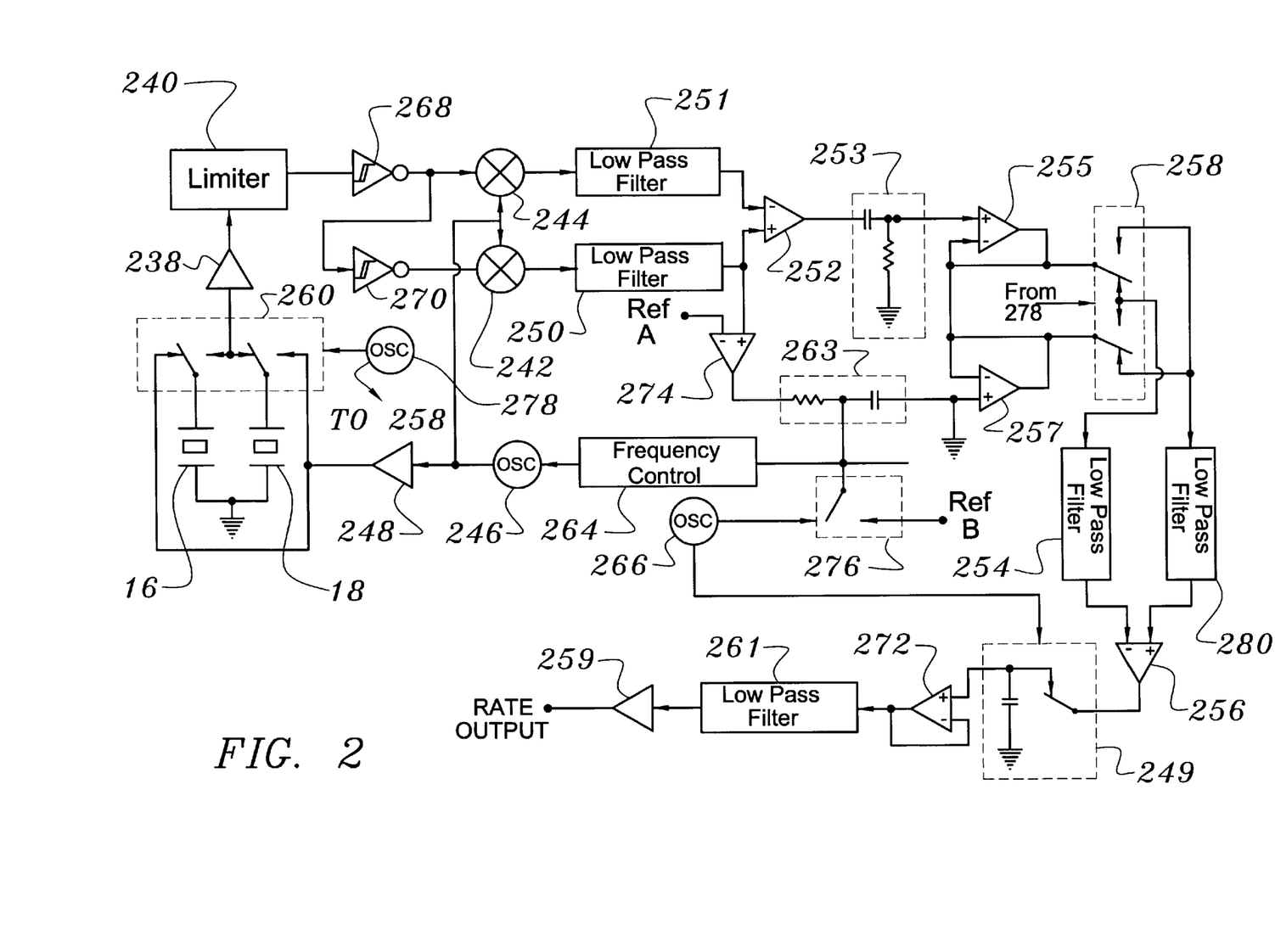
FIG. 2 illustrates a block diagram indicating the functional blocks of electronic circuitry of the sensor in accordance with a preferred embodiment of the present invention.

FIG. 2 illustrates the block diagram of a representative electronic circuit for the present invention. Oscillator 246 generates a high frequency carrier signal which is amplified by amplifier 248 and routed through relay 260 to transducer 16. The acoustic energy received by transducer 18 is converted to the corresponding electrical signal which is routed through relay 260 to amplifier 238, and then to limiter 240. The output from limiter 240 enters Schmitt trigger 268 which then provides an inverted signal to phase detector 244 and Schmitt trigger 270. The output signal from Schmitt trigger 270 enters phase detector 242. Both phase detectors 244 and 242 also receive a common input from oscillator 246, and each provides an output signal to the corresponding low pass filters 250 and 251, whose outputs then enter differential amplifier 252. The alternating signal component of the signal from amplifier 252 passes through differentiating circuit 253 to buffer amplifier 255 and then to inverting buffer amplifier 257. The output of amplifier 257 is then routed by relay 258 to the low pass filters 254 and 280 and then to differential amplifier 256. The output from amplifier 256 enters the switch 249 and is routed through buffer amplifier 272, low pass filter 261, and amplifier 259 for providing the rate output signal.

Oscillator 278 activates relays 260 and 258. Oscillator 266 activates switches 276 and 249. Amplifier 274 detects the voltage difference between the output from low pass filter 250 and a reference voltage "A", and produces an output signal which passes through low pass filter 263 to the frequency control 264 to vary the frequency of oscillator 246 as in a phase locked loop. The output from low pass filter 263 is also switched to a reference voltage "B" when switch 276 is activated by oscillator 266. Balanced circuits are indicated to reduce drift and increase dynamic operating range.

Oscillator 246 produces a continuous carrier signal at a high frequency, for example 4 MHz. This signal is increased in magnitude by amplifier 248 and routed through relay 260 to transducer 16 which emits a corresponding acoustic signal. A portion of that acoustic signal is received by transducer 18 which converts it into a corresponding electrical signal that is routed by relay 260 to amplifier 238 to increase its magnitude and then to limiter 240 to produce a relatively large output signal for the smallest received signal of interest to insure that the Schmitt trigger 268 is reliably switched between its trigger points. The Schmitt trigger 268 drives the second Schmitt trigger 270 so that phase detectors 244 and 242, provide 180 degree phase opposed received signals while their other inputs from oscillator 246 are of the same phase. The outputs from the phase detectors 244 and 242, are therefore phase opposed and enter low pass filters 250 and 251 to remove the high frequency components prior to entering differential amplifier 252. The differential amplifier 252 extracts their difference voltage, the magnitude of that voltage being a function of the phase difference between the oscillator 246 signal and the signal provided by transducer 18.

Relay 258 and 260 are activated by oscillator 278 which produces a square wave at a relatively low frequency, typically 100 Hz. Relay 260 comprises means or alternating the functional states of receiving and transmitting for the two transducers 16 and 18, so that the difference in the transit times between the upstream and downstream acoustic paths resulting from relative movement between the transducers and the fluid flow being sensed produces an alternating signal at the output of amplifier 252. The DC component of the output signal of amplifier 252 is removed by differentiating circuit 253 so that only the magnitude of the alternating component of that signal enters buffer amplifier 255 and then its inverting amplifier 257. DC drifts present at the output of amplifier 252 are thereby eliminated so that they will not affect the output and, in particular, the zero stability of the rate output signal.

The phase opposed signals from amplifier 255 and inverter 257, are synchronously switched in relay 258 at the 100 Hz frequency provided by oscillator 278. This provides rectification of the signals therefrom, which are then smoothed by low pass filters 254 and 280, prior to entering differential amplifier 256.

The output signal from amplifier 256 is then a DC voltage responsive to the magnitude of the difference in transit time between the mode of operation where transducer 16 transmits while transducer 18 receives, and the mode of operation where transducer 18 transmits while transducer 16 receives. The output from amplifier 256 enters the normally closed switch 249, which has in parallel with its output a capacitor for retaining the most recent amplifier 256 output voltage in the event switch 249 is opened. Amplifier 272 is a high impedance buffer amplifier to minimally discharge the capacitor when switch 249 opens and provides the signal through lowpass filter 261 to output amplifier 259.

Transducers exhibit the equivalent of acoustic phase drift in characteristics due to aging, temperature, mechanical stress and other factors, which affect the precision of the flow rate measurement. The mechanical mounting of the transducers and their relationship to the acoustic reflecting surfaces that they interact with, particularly if those surfaces are of plastic, may be unstable over a period of time considering moisture absorption, accumulation of surface contamination and stress relief. Mechanical stress and temperature can also cause acoustic phase drift. Because of the desire to produce a small insertion probe, the spacing between the transducers is relatively small and relatively small mechanical changes increase the drift problem. The higher frequencies desired to increase phase detection sensitivity because of the small transducer-to-transducer spacing, result in further instabilities. Add the above drift promoting factors to the phase drifts produced by the supporting electronics, particularly when they are of relatively low cost commercial quality and designed with a clear intent to reduce costs, and the total impact of these drifts can be catastrophic for a transit-time flow sensing product. It can now be appreciated that the prior art does not overcome these difficulties to produce a commercial product competitive with probes relying on other flow sensing technologies, while the present invention is successful at doing so.

It may at first seem obvious that the phase locked loop would alone be sufficient to provide the frequency control of oscillator 246 so that the average output from phase detector 242 is maintained in the center of its operating range. However, this is not the case. Consider, for example, that while the frequency range of the oscillator needs to be great enough to compensate for the few acoustic wavelengths of maximum possible phase drift, it should be no greater in order to minimize oscillator 246 phase noise and drift. This would be, for example, the equivalent of one or two acoustic wavelengths on either side of its center frequency. However, should phase lock occur with oscillator 246 operating close to a limit of its frequency range, and subsequent phase drift requires oscillator 246 to change its frequency in the direction that it is incapable of accommodating, the resultant will be sensor performance degradation, if not actual failure. Oscillator 246 might become phase locked close to a frequency limit when operating power is applied, for example, or because the acoustic path has been broken, for example, because of insufficient flowing fluid or absorption of the acoustic energy. This could also occur because of reflection or scattering of the acoustic beams due to composition of the flowing fluid and then being reestablished, or because of phase drift inherent in the sensor. In any case, a means is required to both initialize and maintain the frequency of oscillator 246 and phase detector 242 in the nominal center of their operating ranges.

The above is accomplished by providing a switch 249 which is activated by oscillator 266, and which produces a pulse at a very low frequency, for example once every minute, to enable the frequency control circuits to reset to the center of their operating range. During the time of this pulse and for a short time afterwards to enable the circuits to stabilize, a total duration of, for example, two seconds, the output from amplifier 259 is maintained at the value existing just before the pulse occurred to avoid upsetting the rate output signal.

Oscillator 266 also activates relay 276 which connects during the oscillator 266 pulse, the reference voltage "B" to the capacitor of long time constant filter 263 to force it to the voltage which acts on frequency control 264 to adjust the frequency of oscillator 246 to the nominal center of its operating range. At all other times, the signal representative of the phase difference between the oscillator 246 and Schmitt trigger 270, as it appears at the output of low pass filter 250, is used in conjunction with amplifier 274 and low pass filter 263 as in a conventional phase locked loop. Reference voltage A is of the magnitude corresponding to the detector 242 center of its operating range so that amplifier 274 will vary its output voltage to maintain the voltage on its positive input essentially equal to that on its negative input, thereby locking the loop. The low pass filter 263 has a relatively long time constant so that its output does not contain a significant 100 Hz component, enabling the phase locked loop to respond only to the average of the phase detector 242 output, while the full alternating component of its signal enters amplifier 252.

An alternative method of control is to have a phase shift block with a similar number of acoustic cycles of phase shift capacity located between oscillator 246 and the phase detectors 242 and 244, which is similarly controlled by phase detector 242, low pass filter 250, amplifier 274 and low pass filter 263 to maintain the phase detector 250 output centered in its operating range. In this case, the phase shift block is periodically connected by switch 276 to the reference "B" voltage to force its operation to the nominal center of its operating range. In this method, oscillator 246 is not frequency controlled and the frequency control block 264 is omitted.

Reset of the phase locked loop occurs periodically as a function of the oscillator 266 frequency. Reset can also occur by alternate means, for example, by detecting when power is first applied, when the average output from phase detector 242 is detected to be sufficiently removed from its center value, when the acoustic signal is reestablished after loss or when other criteria are met.

The use of balanced circuits, as in the case of phase detectors 242 and 244, for example, reduces the upsetting effect of the reset pulse. This is because the oscillator 246 is never phase locked exactly to the center of its frequency range and must make an abrupt frequency change before resuming stable phase lock. In some applications this disruption may be small enough to be insignificant so that relay 249 and amplifier 272 may be omitted. Furthermore, relay 249 and amplifier 272 may be omitted if the reset pulse occurs infrequently enough for the intended sensor application, although it produces a significant change in the rate output signal.

The reset means and overall high sensitivity signal-to-noise ratio employed in the present invention, as exemplified in particular in FIG. 2, make the sensor very tolerant of operating conditions. Flow probes can now be made economically with small dimensions which make them easy to install. These probes can have their transducers set at small angles, such as 75 degrees with respect to the flow axis, and thereby be relatively small so that the hole in the pipe through which the probe passes during installation is likewise, relatively small. For example, a probe may be made with a 0.8" transducer 16 to transducer 18 spacing and fitting through a 1.0" hole in the wall of a pipe. Furthermore the probe will be relatively tolerant of the distance between the reflector and the transducers 16 and 18, so that it can even be supplied without the reflector and rely instead on the opposite inside wall of the pipe that they would be mounted on to act as the reflector and complete the acoustic path between transducers 16 and 18.

A relatively small amount of low pass filtering enables the amplifier 256 output to respond to rapidly changing flow rates so that characteristics of the fluid system in which the probe is used, such as pulsations due to pump impellers, can be detected and provided as an output signal indicative of impeller condition. The sensor 10 may then additionally serve as a flow system maintenance monitor.

The amplifier 256 output may also be used to detect flow variations due to vortex shedding or fluidic oscillators for example. If only flow detection of flow variations is required, the circuit may be simplified by eliminating relay 260, amplifiers 257, 272 and 259, low pass filters 261 and 280, and relay 249. Flow rate pulsations due to Karman vortices as may be produced by a bluff body 38 in the flow stream, whereby the street of vortices pass through one or both acoustic beams of the transducers 16 and 18, of sensor 10 will be detected whereby the frequency of the pulsations is proportional to flow rate. The bluff body 38 may be located to one side of or between the acoustic beams 22. However, if sensor 10 is rotated in its fitting 30 by 90 degrees, one of the posts 36 may be used as the bluff body 38 to produce the vortices.

In the process of detecting the phase difference between the received and transmitted signals, DC offsets appear at the output signal of amplifier 252 which may drift over a period of time and seriously affect the zero flow stability of the sensor. By removing the DC component of that signal with differentiating circuit 253, that source of error is eliminated. In the sensor referred to earlier, zero stability, equivalent to a sensed flow rate of 0.05 inches/second, has been observed. This is significant particularly when it is noted that no high stability or matched filters or other sophisticated or inherently expensive components were used, the transducers were not impedance matched for both the receiving and transmitting functions, and transmitted signals were seriously distorted from the desired sinusoidal wave shapes. Furthermore, conventional and relatively low cost commercial components were used throughout to reflect the commercial intent of future products based upon the present invention. Additionally, only three adjustments, these being output zero, output span and center frequency, are required for the entire circuit.

Exclusive-OR gates operating at the carrier frequency are preferably used as the phase detectors 242 and 244 to detect the phase shift between the locally generated signal from oscillator 246 and the received signal from transducer 216. There is no translation of frequency so that phase noise and drift from this source is minimized. The circuit would also function if the phase detectors were supplied with receive signals having the same phase while the signals from oscillator 646 were phase opposed. The carrier frequency used is relatively high, typically 4–10 MHz, so that a substantial flow related phase shift occurs for a physically small probe.

It is noteworthy that the transmitting signals may be seriously distorted without seriously affecting the overall operation of the sensor. The output of amplifier 248 may be a square wave, whereby only a small inductive impedance in series with relay 260 is used to provide a semblance of series resonance with the transducer capacitance. Furthermore, The circuit is very tolerant of impedance mismatch of the transducers 16 and 18, between the functions of transmitting and receiving, so that in an existing practical sensor design there is no provision for such matching.

Since the transmitted and received acoustic signals are always present in the general application of the present invention with each transducer operating half of the time to transmit and the other half to receive, phase detection occurs over many carrier cycles. In this manner, signal detection averaging is extensive and the signal-to-noise ratio is high. Therefore, at the relatively low alternating frequency of 100 Hz (compared to a 4 MHz carrier frequency) and the relatively short acoustic transit time (because of the short length of the acoustic path between the transducers 16 and 18), any error introduced because of resultant signal delays in the acoustic path between the transducers 16 and 18 will, on the average, be a very small factor of the rate output signal and will therefore be negligible. However, should the transit time become significant, one or more functional blocks for receiving or detecting the rate related signals, such as a portion of relay 260 and amplifiers 238 and 268, limiter 240, inverter 270, and phase detectors 642 and 244, would be disabled for the required interval during the transducers 16 and 18, transmitting/receiving alternation.

When the acoustic signals are reflected between the transducers with a flat reflector, the received signal is a summation of the transmitted signal having taken more than one path because of beam spreading. As the transmitted frequency changes to maintain phase lock and center phase detectors, 242 and 244, operating points, the change in the relative magnitudes and phase relationships of the components of the received signal may cause increased noise and drift in the rate output signal. This problem may be reduced by curving the surface of the reflector facing the transducers in the direction along the axis between the transducers with a radius equal to about two times the distance between the midpoint between the transducers and reflector. Because this degree of curvature is very small, it should not affect fluid flow sensing in most applications. The inside surface of a pipe would not provide the same benefit because its curvature is orthogonal to that desired.

In some applications it will be desired to operate the sensor with low power. Considerable power reduction without serious loss of flow measurement precision may obtained by enabling all the sensor's functional blocks operating at the acoustic path frequency to operate for only a few alternating cycles within a larger period of operation, whereby low pass filter 263 becomes equipped with a sample-and-hold circuit to retain its frequency control voltage during that period. Relay 249 acts in effect as a sample and hold circuit and would be switched to amplifier 256 only during the latter portion of the alternating frequency cycles when the amplifier 256 output signal has stabilized. Since the functional blocks operating at the acoustic path frequency consume almost all of the operating power of the sensor, a large power reduction is possible. For example, with a larger period of one second and the acoustic path functional blocks being active for 100 milliseconds, the power reduction is nearly 90%.

Figure 3:
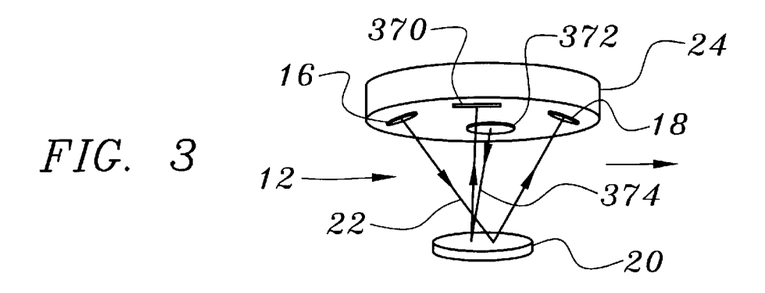
FIG. 3 illustrates an arrangement of two pairs of transducer elements in accordance with a preferred embodiment of the present invention.

The flow sensor configuration of probe 10 is also suitable for use in open channels and in large bodies of water, for example, as it provides for the complete reflective path within itself and can operate with low power. Furthermore, a second set of transducers 370, 372 located in an enlarged from of housing 24, and mounted orthogonally to transducers 16 and 18, which similarly beam to and receive from reflector 20, will provide a measurement of flow rate in a direction orthogonal to the first set whereby their rate and directional components enable a resultant flow rate and angle to be determined by electronic computation. Such a transducer arrangement is illustrated in FIG. 3 whereby transducers 16 and 18 of probe 10 establish an acoustic energy beam line 22. The beam line 22 is reflected by reflector 20 to sense the component of fluid flow which moves horizontally across the page, in the direction of arrow 12. Transducers 370 and 372, mounted in the same housing 24, also establish an acoustic energy beam, represented by lines 374, to sense the component of flow moving orthogonally to energy beam 22. It is possible for both sets of transducers 316,318 and 370,322 to operate at the same time with their own supporting electronics when the acoustic beam angles are narrow if there is otherwise good acoustic and electrical isolation between them. However, they may for example also time share the same electronics or operate at different frequencies.

The installation of probe 10 in a pipe for example, typically requires that it be angled to the flow precisely, if the best flow sensing accuracy is to be achieved. Observing an indication of a flow rate measurement while adjusting the probe angle for the maximum indication is useful, but often unsatisfactory, considering that flows are often not constant enough. A pipe mounted flow probe configured as in FIG. 3 however, would do very nicely whereby the second set of transducers 370 and 372, sensing fluid flow orthogonal to primary flow direction 12 through the pipe, would be aligned to produce an output signal null when the probe angle is exactly correct. As a null indication, the magnitude of the fluid flow 12 rate is not important as long as some flow 12 is occurring so that a steady flow rate is no longer necessary. A null type of indication is also more sensitive and can be made to respond faster.

In some fluid handling systems, the fluid flow is not reasonably uniform and straight with a variability depending on flow rate and other factors such as nearby valve states. The affects of these nonuniformaties may also be sensed by the second set of transducers 370 and 372, with their flow responsive signals being used for correcting for flow measurement being made by transducers 316 and 318.

The second set of transducers 370 and 372, if not used to provide a precision rate measurement, need not be mechanically located as shown and do not even have to make use of reflector 20. Transducers 370 and 372 merely need to lie parallel to and facing each other with the flow and acoustic energy passing between them to respond to the component of flow which is not parallel. Since transducers 370 and 372 have the axis between them perpendicular to the fluid flow 312, they may additionally be used to directly measure the speed of sound of the fluid whereby the output signal obtained therefrom is used, for example, to vary the gain of amplifier 259 to compensate for flow rate errors due to fluid temperature or composition changes. Any suitable supporting electronics configurations including those listed in the earlier "Discussion" hereof may be used to obtain the related output signals. Compensation means may also be had by measuring the temperature of the flowing fluid and using the output signal obtained therefrom to similarly vary the gain of amplifier 259, when ere is close correlation between the fluid temperature and the speed of sound.

When used in flow environments which encourage the accumulation of surface coatings, debris or biogrowths, electrolytic means may be used to clean or maintain clean the acoustically active surfaces. This would consist, in a sea water environment for example, of a positive potential being applied to the flow sensing or nearby surfaces which had been platinum plated so as to cause a corresponding electric current to flow through the water to and generate chlorine gas at those active surfaces. Nearby insulated electrodes or conductive surfaces with a corresponding negative potential complete the current path. Low currents of several milliamperes and less have been found effective in maintaining the surfaces of a small flow sensor of a few square inches in surface area clean in such environments.

Those skilled in the art can now appreciate from the foregoing description that the broad teachings of the present invention can be implemented in a variety of forms where a transit-time ultrasonic flow sensor is configured as a self contained modular system. Therefore, while this invention has been described in connection with particular examples thereof, the true scope of the invention should not be so limited since other modifications will become apparent to the skilled practitioner upon a study of the drawings, specifications and claims.

What is claimed is:

1. A transit-time flow sensor for measuring an acoustic propagation time difference between upstream and downstream acoustic transmissions in a fluid and for determining the flow rate of the fluid therefrom, wherein the fluid wets a probe portion of the sensor, the probe portion comprising;

first and second transducers, each of the transducers having a respective transmitting functional state and a respective receiving functional state, each of the transducers adapted to transmit acoustic energy at a first frequency along an axis parallel to a direction of flow of said fluid when said each transducer is in its respective transmitting state, each transducer adapted to receive said acoustic energy transmitted by the other transducer when said each transducer is in its receiving state; and a reflector adapted to convey said acoustic energy between said transducers;

the sensor further comprising:

means for alternating the transmitting and receiving states of the transducers so as to always have one of the two transducers in its respective transmitting state and the other of the two transducers in its respective receiving state, the means for alternating adapted to act at a second frequency substantially less than the first frequency;

means for providing a continuous carrier signal at the first frequency to the transmitting one of said transducers; and a phase detector containing a low pass filter for providing an output signal responsive to a phase difference between electrical signals corresponding to, and of the same frequency as, the transmitted and received acoustic energy.

2. The transit time flow sensor of claim 1, further comprising means to correct a drift in said phase difference between said transmitted and received acoustic energy by changing the first frequency.

3. The transit time flow sensor of claim 1, further comprising means to correct a drift in said phase difference between said transmitted and received acoustic energy by a phase shift change of the phase relationship of said electrical signals corresponding to the transmitted and received acoustic energy.

4. The transit time flow sensor of claim 1, wherein a surface of said reflector faces said transducers, said surface having a radius of curvature along an axis between said transducers that is equal to approximately two times the distance between a midpoint between said transducers and said reflector.

5. The transit time flow sensor of claim 1, further comprising a third transducer and a fourth transducer which are mounted orthogonally as a pair to said first and said second transducers, said sensor further comprising processing means for determining a component of said flow rate which is orthogonal to an axis extending between the third and the fourth transducers.

6. The transit time flow sensor of claim 1, further comprising a third transducer and a fourth transducer which are mounted as a pair orthogonally to said first and second transducers, said sensor further comprising processing means responsive to changes in the speed of sound of said fluid, the processing means adapted to correct said output signal for said changes.

7. The transit time flow sensor of claim 1, further comprising third and fourth transducers which are mounted as a pair orthogonally to said first and second transducers so that a surface of the reflector comprises a portion of an acoustic path between the third and the fourth transducers.

8. The transit time flow sensor of claim 1 further comprising a bluff body for generating a Karman vortex street comprising a plurality of vortices that pass through an acoustic beam extending between said transducers, the sensor further comprising means for measuring a frequency of variation in said flow rate caused by said vortices.

9. A transit time flow sensor for determining a flow rate of a fluid from a measurement of an acoustic propagation time difference between upstream and downstream acoustic transmissions in the fuid, wherein the fluid wets a probe portion of the sensor, the probe comprising:

first and second transducers, each of the transducers having a respective transmitting functional state and a respective receiving functional state, each of the transducers adapted to transmit, when in its transmitting state, acoustic energy at first, controllable, frequency, the acoustic energy transmitted along an axis parallel to a direction of flow of said fluid, each transducer further adapted to receive said acoustic energy transmitted by the other transducer when said each transducer is in its receivg state; and a reflector adapted to convey said acoustic energy between said transducers; the sensor further comprising:

means for repeatedly alternating the transmitting and receiving states of the transducers so as to always have one of the two transducers in its respective transmitting state and the other of the two transducers in its respective receiving state, the means for alternating adapted to act at a second frequency substantially less than the controllable frequency;

means for providing a continuous carrier signal at the controllable frequency to that one of said transducers that is in its transmitting state;

a phase detector containing a low pass filter for providing an output signal responsive to a phase difference between electrical signals corresponding to, and of the same frequency as, said transmitted and received acoustic energy; and a phase locked loop adapted to act responsive to the output signal to control the controllable frequency, so that said phase detector operates, on the average, at a center of its operating range.

10. The transit time flow sensor of claim 9, wherein the means for alternating the receiving and transmitting states comprises:

a first switch adapted to periodically switch, at a third frequency substantially less than the second frequency, so as to provide a momentary pulse from a voltage source to said low pass filter;

a second switch adopted to operate at said second frequency so as to synchronously detect a magnitude of said output signal from said phase detector; and means to filter, amplify and process said synchronously detected output signal and provide it as an output flow rate signal.

11. The transit time flow sensor of claim 10, wherein said first switch is adapted to operate when the controllable frequency is not at a nominal center of its operating range.

12. The transit time flow sensor of claim 10, wherein said means to filter, amplify and process said synchronously detected output signal includes means for retaining said output signal during a reset pulse at the value existing prior to the commencement of said reset pulse.

13. The transit time flow sensor of claim 9, wherein said means for providing a controllable frequency is adapted to provide a fixed frequency and its output to said phase detector is phase controlled.

14. The transit time flow sensor of claim 13 wherein said first switch is adapted to operate when said phase detector is detected to be other than at a nominal center of its operating range.

15. The transit time flow sensor of claim 9, wherein a surface of said reflector faces said transducers, the surface having a radius of curvature along an axis between said transducers that is equal to approximately two times the distance betveen a midway point between said transducers and said reflector.

16. The transit time flow sensor of claim 9, further comprising a third transducer and a fourth transducer which are mounted as a pair orthogonally to said first and second transducers so that a surface of the reflector comprises a portion of an acoustic path between the third and the fourth transducers.

17. The transit time flow sensor of claim 9, further comprising a third transducer and a fourth transducer which are mounted as a pair orthogonally to said first and second transducers, said sensor further comprising processing means responsive to changes in the speed of sound of said fluid, the processing means adapted to correct said output signal for said changes.

18. A transit-time flow sensor for sensing an acoustic propagation time difference between upstream and downstream acoustic transmissions in a fluid and for determining the flow rate of the fluid therefrom wherein the fluid wets a probe portion of the sensor, the probe portion comprising:

first and second transducers, each of the transducers having a respective transmitting functional state and a respective receiving functional state, each of the transducers adapted to transmit acoustic energy at a first frequency along an axis perpendicular to a direction of flow of said fluid when said each transducer is in its respective transitting state, each transducer adapted to receive a portion of the acoustic energy transmitted by the other transducer when said each transducer is in its receiving state;

the sensor further comprising:

means for repeatedly alternating the transmitting and receiving states of said transducers so as to always have one of the two transducers in its respective transmitting state and the other of the two transducers in its respective receiving state; and means responsive to a change in time between said transmitted and said received acoustic energy for indicating a flow rate component that is not along the axis.

19. A transit-time flow sensor for measuring an acoustic propagation time difference between upstream and downstream acoustic transmissions in a fluid and for determining a flow rate of the fluid therefrom wherein the fluid wets a probe portion of the sensor, the probe portion comprising:

first and second transducers, each of the transducers having a respective transmitting functional state and a respective receiving functional state, each of the transducers adapted to transmit acoustic energy at a first frequency when said each transducer is in its respective transmitting state, each transducer adapted to receive acoustic energy transmitted by the other transducer when said each transducer is in its receiving state; and a reflector adapted to convev said acoustic energy between said transducers;

the sensor further comprising:

a bluff body for generating a Karman vortex street in said fluid and for therebv producing a plurality of vortices that pass through at least one acoustic pathlsl betveen said reflector and said transducers; and means responsive to a change in time between said transmitted and said received acoustic energy caused by said Karman v ortex street for generating an electrical signal with a frequency representative of said flow rate.

20. The transit time flow sensor of claim 19, wherein said bluff body is a supporting member for said reflector.

* * * * *

UNITED STATES PATENT AND TRADEMARK OFFICE
CERTIFICATE OF CORRECTION

PATENT NO. : 6,178,827 B1
DATED : January 30, 2001
INVENTOR(S) : Murray F. Feller It is certified that error appears in the above-identified patent and that said Letters Patent is hereby corrected as shown below:

Title page,
Item [76] in the inventor's address, "Q1577" should read -- 21577 --.

Column 10,
Line 65, the last word in Claim 4, "rcflector" should be -- reflector --.

Column 11,
Line 38, "receivg state" should be -- receiving state --.

Column 12,
Line 44, in the preamble of Claim 18 a comma was omitted between "therefrom" and "wherein".
Line 52, "respective transitting state" should be -- respective transmitting state --.

Column 13,
Line 12, "convev" should be -- convey --.

Column 14,
Line 2, "therebv" should be -- thereby --.
Line 4, "pathlsl" should be -- path --.
Line 9, "v ortex" should be -- vortex --.

Signed and Sealed this

Twenty-third Day of October, 2001

Attest:

NICHOLAS P. GODICI
Attesting Officer
Acting Director of the United States Patent and Trademark Office